US011607937B2

(12) United States Patent
Nellen et al.

(10) Patent No.: US 11,607,937 B2
(45) Date of Patent: Mar. 21, 2023

(54) ROOF SYSTEM FOR A VEHICLE (71) Applicant: Inalfa Roof Systems Group B.V., Oostrum (NL)

(72) Inventors: Marcel Johan Christiaan Nellen, Merselo (NL); Rainer Gerhard Jüngling, Mönchengladbach (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/060,774

(22) Filed: Oct. 1, 2020

(65) Prior Publication Data
US 2021/0016643 A1    Jan. 21, 2021

Related U.S. Application Data (63) Continuation of application No. 16/173,758, filed on Oct. 29, 2018, now Pat. No. 10,807,451.

(30) Foreign Application Priority Data

Oct. 31, 2017  (EP) .................................... 17199380

(51) Int. Cl.
*B60J 7/043*    (2006.01)
*B60J 7/02*    (2006.01)
(52) U.S. Cl.
CPC ............. *B60J 7/0435* (2013.01); *B60J 7/024* (2013.01); *B60J 7/022* (2013.01)
(58) Field of Classification Search
CPC ................................ B60J 7/0435; B60J 7/024
(Continued)

(56) References Cited

U.S. PATENT DOCUMENTS 4,601,512 A    7/1986  Boots
5,028,090 A    7/1991  Huyer
(Continued)

FOREIGN PATENT DOCUMENTS

DE           10348545 A1    5/2005
DE      102005059285 A1    6/2007
(Continued)

OTHER PUBLICATIONS

European Office Action dated Jul. 16, 2020, for corresponding European Patent Application No. 17199380.1.
Non-Final Office Action for U.S. Appl. No. 16/173,758, filed Oct. 29, 2018, dated Mar. 3, 2020.
Non-Final Office Action for U.S. Appl. No. 16/173,758, filed Oct. 29, 2018, dated Nov. 22, 2019.
(Continued)

*Primary Examiner* — Dennis H Pedder
(74) *Attorney, Agent, or Firm* — Steven M. Koehler; Westman, Champlin & Koehler, P.A.

(57) ABSTRACT

A roof system includes a closure panel that opens a roof opening in which it is positioned partially above a portion of a roof. An operating mechanism includes a front device having a lever for moving the front edge of the panel in a vertical direction. The lever is pivotally connected to a driving slide that has a cam partly in engagement with a stationary guide curve and is in engagement with the panel through a pin-curve assembly. A curve of the pin-curve assembly has a guiding curve extending allowing a corresponding pin to slide along it to move the front of the panel at least in vertical direction when the lever is driven by the driving slide. A locking curve extends mainly vertically when a pin is positioned in the locking curve in order to allow the driving slide to slide the panel in longitudinal direction.

20 Claims, 10 Drawing Sheets (58) Field of Classification Search
USPC .................. 296/216.02–216.6, 223, 222
See application file for complete search history.

(56) References Cited

U.S. PATENT DOCUMENTS

| | | | |
|---|---|---|---|
| 5,058,947 | A | 10/1991 | Huyer |
| 5,092,651 | A | 3/1992 | Baldwin et al. |
| 5,275,461 | A * | 1/1994 | Cheron ................. B60J 7/0435 296/216.03 |
| 6,174,024 | B1 | 1/2001 | Kronseder et al. |
| 8,182,029 | B2 | 5/2012 | Van Boxtel et al. |
| 2002/0093226 | A1* | 7/2002 | Schleicher ................. B60J 7/05 296/222 |
| 2002/0113467 | A1 | 8/2002 | Radmanic |
| 2002/0163228 | A1 | 11/2002 | Wingen et al. |

FOREIGN PATENT DOCUMENTS

| | | | |
|---|---|---|---|
| DE | 102008024948 A1 * | 12/2009 | .............. B60J 7/043 |
| DE | 102008024948 A1 | 12/2009 | |
| DE | 102009052622 A1 | 5/2011 | |
| EP | 0343750 A1 | 11/1989 | |
| EP | 2263896 A1 | 12/2010 | |
| GB | 2140500 A | 11/1984 | |

OTHER PUBLICATIONS

European Office Action in corresponding European Patent Application No. 17199380.1 dated Feb. 9, 2021.
European Office Action in corresponding European Patent Application No. 17199380.1 dated Oct. 19, 2021.
European Search Report and Opinion in corresponding European Patent Application No. 17199380.1 dated Feb. 16, 2018.

* cited by examiner

ROOF SYSTEM FOR A VEHICLE

CROSS-REFERENCE TO RELATED PATENT APPLICATION

The present application is a continuation of and claims priority of U.S. patent application Ser. No. 16/173,758, filed Oct. 29, 2018, the content of which is hereby incorporated by reference in its entirety.

BACKGROUND

The discussion below is merely provided for general background information and is not intended to be used as an aid in determining the scope of the claimed subject matter.

Aspects of the invention relate to a roof system for a vehicle having a roof opening in a roof thereof. The roof system includes least a closure panel, which is movable between a closed position in which it closes the roof opening and an open position in which it opens the roof opening and is positioned at least partially above an adjoining portion of the roof part.

The closure panel is provided with a front support allowing the closure panel to pivot and slide in a first stationary guide curve. A stationary guide rail at each longitudinal side of said roof opening slidably guides an operating mechanism that operates the closure panel in a longitudinal direction of the vehicle. The operating mechanism includes a rear device for moving the rear edge of the closure panel towards a raised position relative to the closed position and above the adjoining portion of the roof part. A front device includes a lever for moving the front edge of the closure panel in a vertical direction.

A driving slide, which is slidably accommodated in each guide rail, is drivable by a drive member in order to move the closure panel both in vertical and in horizontal direction through the front device and rear device. The lever of the front device is pivotally connected to the driving slide and is provided with a guide cam which is at least partly in engagement with a stationary guide curve and is in engagement with the closure panel through a pin-curve assembly. A curve of the pin-curve assembly is provided with a guiding curve section extending mainly in horizontal direction, allowing a corresponding pin to slide along it in order to move the front side of the closure panel at least in vertical direction when the lever is driven by the driving slide, where the lever rotates due to a displacement of the cam of the lever through the stationary guide curve.

In this known roof system, the lever of the front device is provided with a guiding curve which is engaged by a cam on the panel when the front of the panel is moved in vertical direction, whereas the lever is further provided with a pin which comes into engagement with a locking curve on the panel when the drive member starts to slide the panel in rearward direction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an aspect of the disclosure, it is proposed that the curve of the pin-curve assembly is also provided with a locking curve section extending mainly in a vertical direction when a corresponding pin is positioned in the locking curve section in order to allow the driving slide to slide the panel in a longitudinal direction through the pin-curve assembly.

Due to this feature, the structure is simpler as the curve of the pin-curve assembly is either on the panel or in the lever, so you do not need two curves on two different parts.

If both curve sections are both in the lever, you just need to redesign the lever, and do not require a separate curve section on the panel.

The simplest design is obtained if the locking curve section and the guiding curve section belong to a single curve engaged by a single corresponding pin.

If one wishes to reduce the building height of the operating system as much as possible, the locking curve section and the guiding curve section may be made separate and open at least at one of their ends, the guiding curve section cooperating with its own corresponding pin during the mainly vertical movement, and the locking curve section cooperating with its own corresponding pin during the mainly horizontal movement of the closure panel.

The locking curve section and the guiding curve section may then be positioned in overlapping relationship in vertical direction in order to further reduce the building height.

The guiding curve section may be formed by a rib on the lever, while the guiding and locking pins on the closure panel are in engagement with opposite surfaces of the rib of the guiding curve when the guiding curve section is guiding the pivoting movement of the lever.

In this way, the locking pin remains active in all positions, and the guiding curve section does not require a slot, because a simpler rib is sufficient as there are two pins available anyhow in this embodiment.

The locking curve section is a slot in which the locking pin engages when the guiding pin disengages from the guiding curve.

The front support of the panel comprises at least a cam engaging a stationary guide curve, and preferably the stationary guide curve of the cam of the front support is the same as the stationary guide curve of the guide cam of the lever, thereby reducing the number of curves for the number of guiding members, such as cams, built in the operating mechanism. Of course, it is also conceivable that the cam of the front support and the cam of the lever each have their own stationary guide curves adapted to obtain the desired movements of the front edge of the closure panel.

BRIEF DESCRIPTION OF THE DRAWINGS

Further details and advantages of the invention will become more clear from the following description of embodiments of the roof system with reference to the drawings.

DETAILED DESCRIPTION

Figures 1A, 1B:
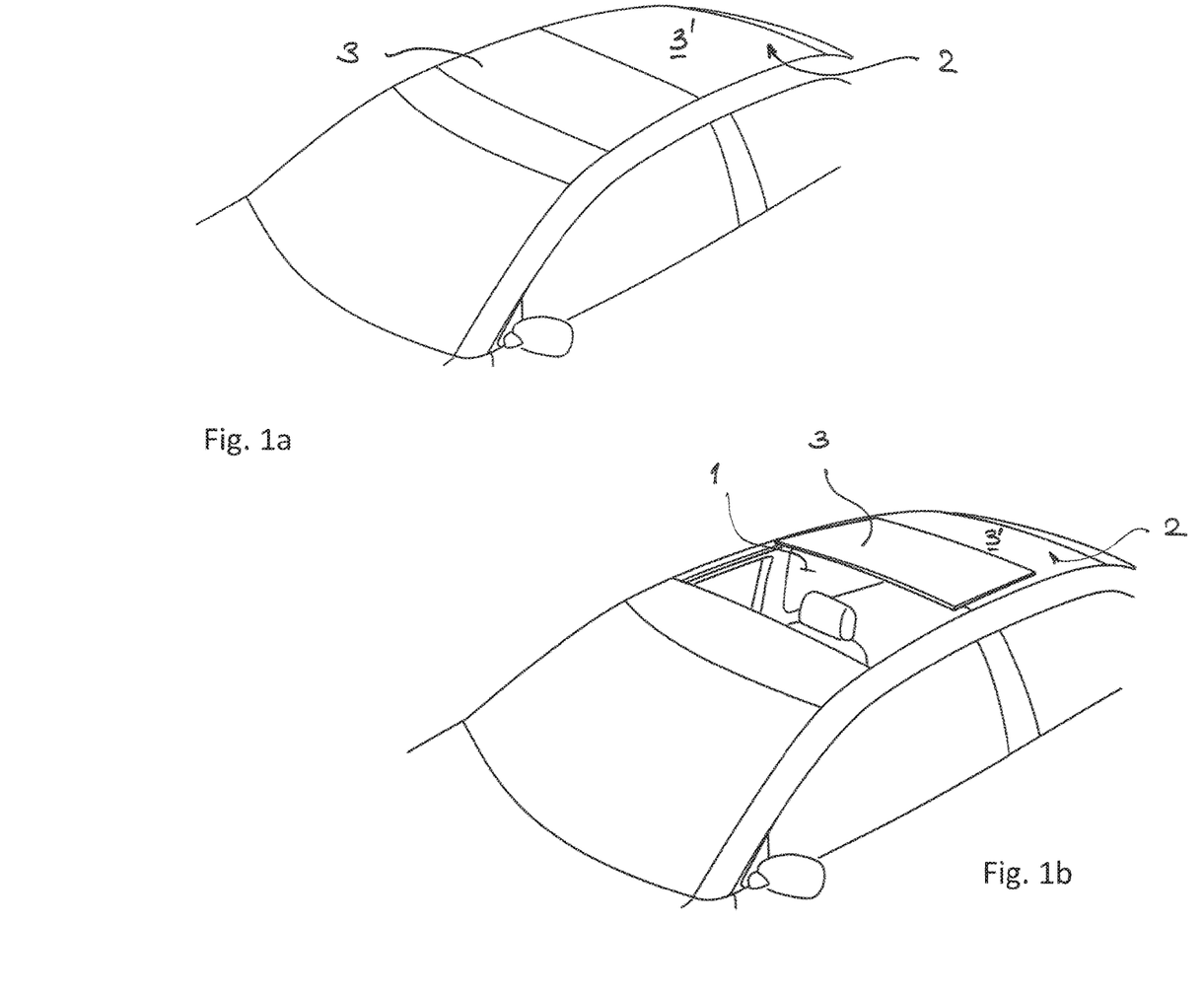
FIGS. 1a and 1b are partial perspective views of an automobile provided with a roof system with the closure panel of the roof system in a closed and open position.

FIGS. 1a and 1b show part of a vehicle, in particular an automobile, which comprises at least a roof opening 1 (FIG. 1b) defined in a (stationary) roof part 2. A closure, here in the form of a closure panel 3, is movable between a closed position (FIG. 1a) in which it closes the roof opening 1, and an open position (FIG. 1b) in which it opens the roof opening 1 and in which it is positioned at least partially above the roof part 2, here the fixed roof part adjoining the rear edge of the roof opening 1.

As is known per se such an roof system (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 3 is formed by a roof panel 3' which may be a stationary roof panel or a movable panel.

Figure 2:
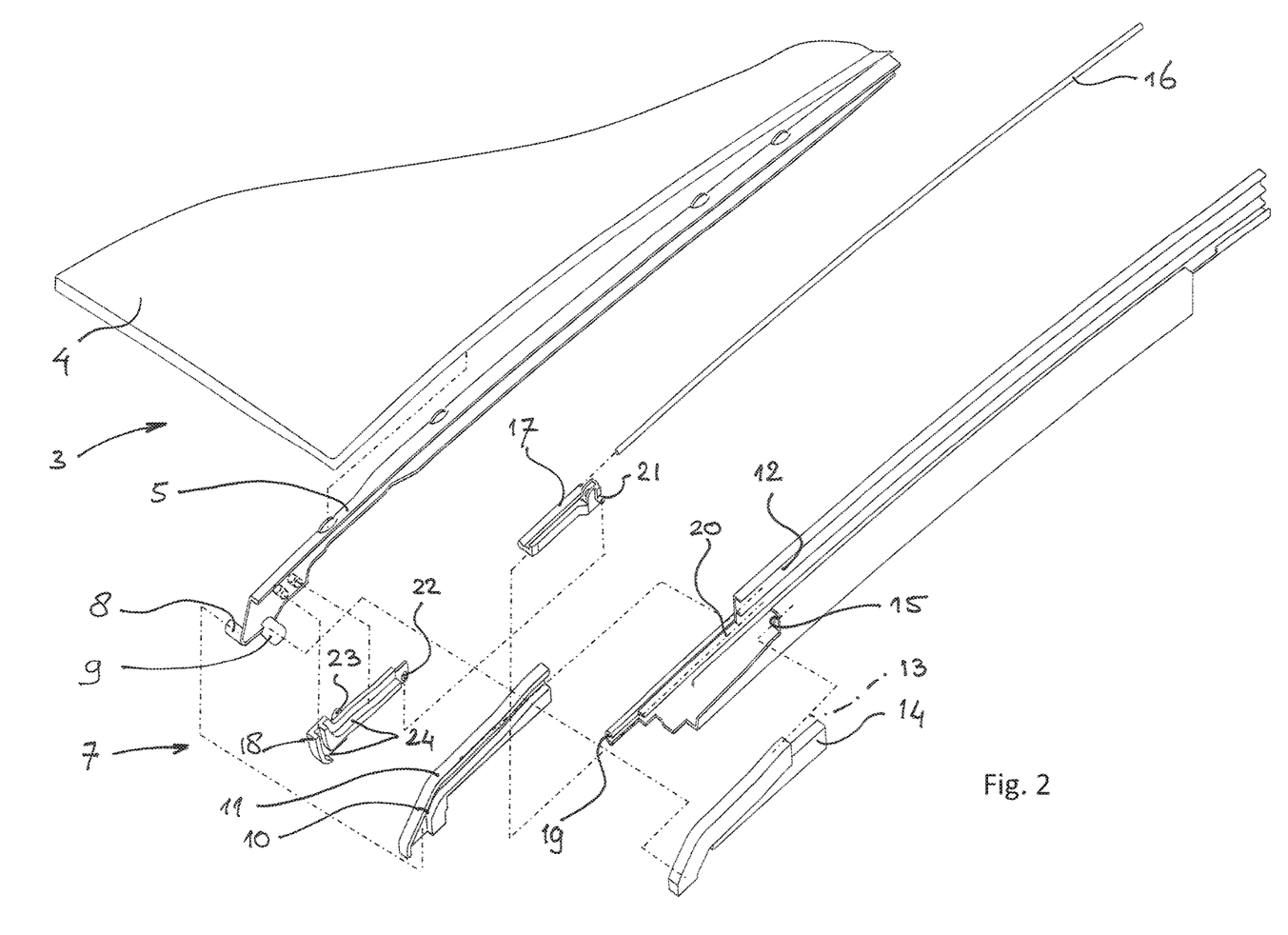
FIG. 2 is an exploded view of the parts of a first embodiment of the front device of the operating mechanism on one side of the closure panel.

FIG. 2 show the parts of an operating mechanism for closure panel 3 in order to move it between the closed and open positions. One of the longitudinal sides of closure panel 3 is shown, and it is noted that the same parts albeit in mirror image are present on the other longitudinal side of panel 3. The panel 3 comprises a glass or plastic transparent or metal nontransparent sheet 4 supported on the longitudinal sides by a panel bracket 5 fixed to sheet 4, for example by encapsulation material and/or any other means. At each longitudinal side edge of roof opening 1 there is provided a stationary guide rail 6 having several guide grooves in which parts of the operating mechanism are slidably guided. The guide rails 6 are straight or slightly curved in order to follow the curvature of the vehicle roof.

To move closure panel 3 in longitudinal (along the guide rail 6) and vertical (substantially perpendicular to the guide rail 6) directions, the operating mechanism comprises a front device 7 to move the front side of closure panel 1 in vertical direction and a rear device (not shown) to move the rear side of closure panel 3 in vertical direction, i.e. up and down. Of course, both devices are also used to move closure panel 3 in longitudinal or horizontal direction, i.e. back and forth. The rear device may be constructed in a known manner, for example as is shown in U.S. Pat. No. 8,182,029 B2, of which the contents of this application are incorporated herein by reference thereto. The rear device per se is not part of this invention.

At the front of panel bracket 5 there are provided two cams 8 and 9 projecting on opposite sides of bracket 5 in transverse direction in order to provide a stable support. Front cam 8 is engaged in a stationary guide curve 10. This stationary guide curve 10 is formed in a (plastic or steel reinforced plastic) member 11 that is attached to stationary guide rail 6. The stationary guide curve 10 has a number of guide curve portions adjoining each other from front to back: a substantially vertical front portion 10', a rearwardly and upwardly inclining portion 10", a longer curved portion 10''' slightly inclining in upward direction and a rear portion 10'''' that is formed by a groove 12 in stationary guide rail 6 connecting to the stationary guide curve 10 in member 11. Cam 9 is engaging in a similar guide curve 13 (with similar curve portions) in a member 14 fixed to the guide rail and connecting to a groove 15 opposite to groove 12. Cam 9 offset a distance in longitudinal direction with respect to cam 8 in order to save space at the front on the outside of the operating mechanism.

The front device 7 of the operating mechanism includes a drive member 16, such as a drive cable moved in longitudinal direction by an electric motor (not shown), a driving slide 17 drivably connected, in this case permanently, to the drive member 16, and a lever 18 in engagement with the driving slide 17. The drive member 17 is guided by a drive cable channel 19 in the stationary guide rail 6, the driving slide 17 is slidably guided in an adjacent guide groove 20. The lever 18 is pivotally connected to the driving slide 17, here through a pivot pin 21 on driving slide 17 fitting in a hole 22 in lever 18. Lever 18 extends in forward direction from the pivot pin 21.

The drive member 16 is able to slide the driving slide 17 in longitudinal direction, vertical pivoting movements of lever 18 during this motion are effected by an engagement of a guide cam 23 on lever 18 into stationary guide curve 10 which in this case is also used by cam 8.

Lever 18 is in engagement with panel 3 through a pin-curve assembly in order to move the closure panel 3 in longitudinal and/or vertical direction. The vertical position of panel 3 can be determined by the pivoting movement of lever 18 and by the extent of the curve of the pin-curve assembly. In this first embodiment, a curve 24 of the pin-curve assembly is provided in lever 18, whereas a pin, in this case two pins 25 and 26, are provided on panel 3. Curve 24 on lever 18 comprises two curve sections, a guide curve section 24a and a locking curve section 24b. Guide curve section 24b is active if the front side of panel 3 is to be moved in vertical direction, locking curve section 24b is active if panel 3 is slid back and forth and should move as a unit with driving slide 17 to which it is substantially locked then. The guide curve section 24a extends mainly in longitudinal direction on lever 18, whereas locking curve section 24b extends mainly in vertical direction, especially in the orientation of lever 18 when locking curve section 24b is active.

In this embodiment, guide curve section 24a is formed by a rib 27 on lever 18 having two substantially parallel guide surfaces 27a and 27b each cooperating with one of pins 25 and 26. Pin 25 cooperates with upper guide surface 27a of guide curve section 24a and is a guide pin. Pin 26 cooperates with lower guide surface 27b of guide curve section 24a and is a locking pin, although it has a double function: it not only moves along guide curve section 24a to move the front side of panel 3 in vertical direction, it also moves into locking curve section 24b to lock panel 3 to driving slide 17.

FIGS. 3a-3d show the operation of the front device of the operating mechanism of FIG. 2.

Figure 3A:
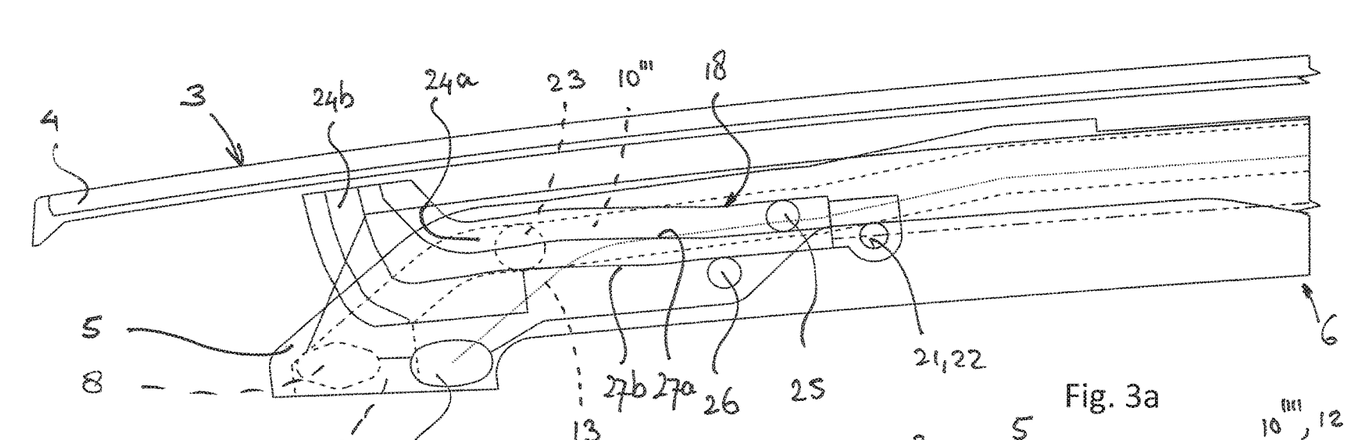
FIGS. 3a-3d are side views of the front device of operating mechanism of FIG. 2 in 4 different positions.

In FIG. 3a, the operating mechanism of the roof system is in a position in which the closure panel 3 closes the roof opening 1. Cam 8 is positioned in its lowest front position in vertical front portion 10', guide cam 23 is positioned at the front end of curve portion 10''' of stationary guide curve 10. Pins 25, 26 are positioned near the rear end of guide surfaces 27a, 27b on the rib 27 of guide curve section 24a. Lever 18, driving slide 17 and drive member 16 are in their foremost position in guide rail 6.

Figure 3B:
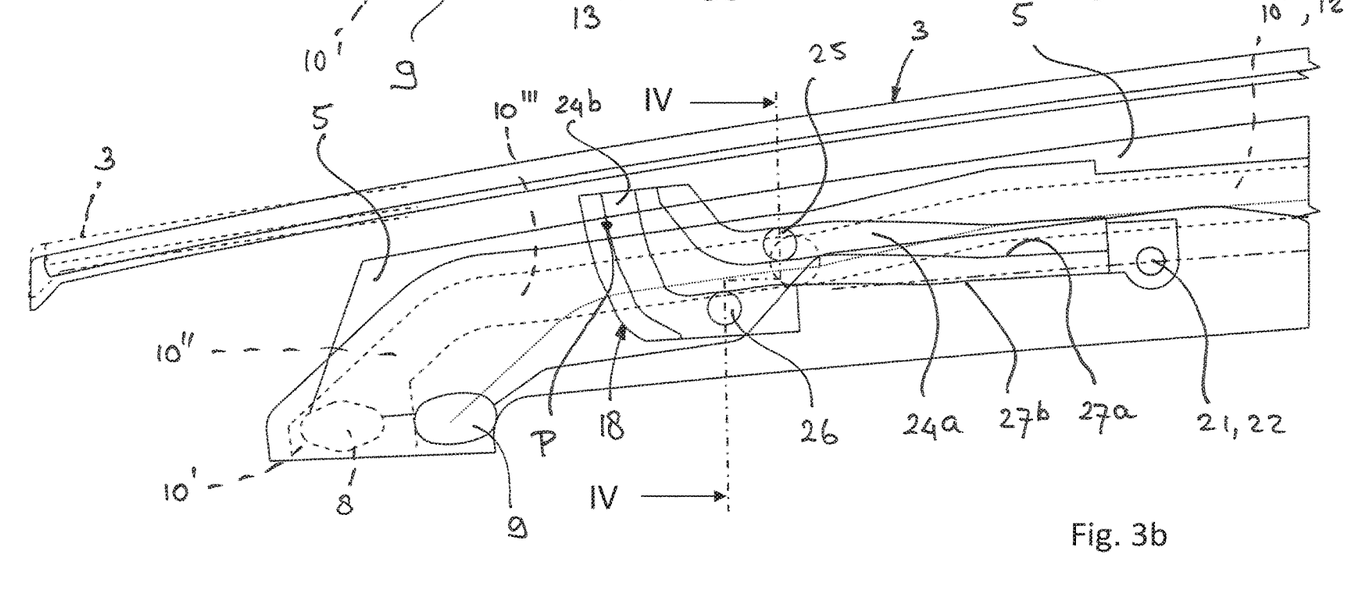

In FIG. 3b, closure panel 3 has been moved to its venting position in which the rear side of closure panel 3 is moved upwardly, whereas the front side of closure panel 3 remains substantially in contact with (the seal on) the front edge of roof opening 1. The panel front side shown in dashed lines represents its closed position according to FIG. 3a). During the tilting movement of panel 3 by means of the rear device of the operating mechanism, lever 18 is moved a distance rearwardly by driving slide 17/drive member 16, so that guide cam 23 is moved rearwardly and slightly upwardly in curve portion 10''' of stationary guide curve 10, so that lever 18 is simultaneously pivoted slightly upwardly. Guide surfaces 27a, 27b have been moved the same distance along pins 25, 26. The combined effect of the movement of the guide cam 23 in guide curve portion 10''' and of the guide surfaces 27a, 27b along pins 25, 26 is that the front side of panel 3 is moved slightly upwardly relative to the position it would have taken without such upward movement. Then, without this compensation, the front side of closure panel 3 would have been lowered more due to the position of the front of panel 3 with respect to virtual pivoting point P which is not desirable because of the loss of contact between the front edge of panel 3 and the front edge of roof opening 1. This virtual pivoting point P also causes cams 8, 9 to move slightly rearwardly (and particularly cam 9 also upwardly).

Figure 3C:
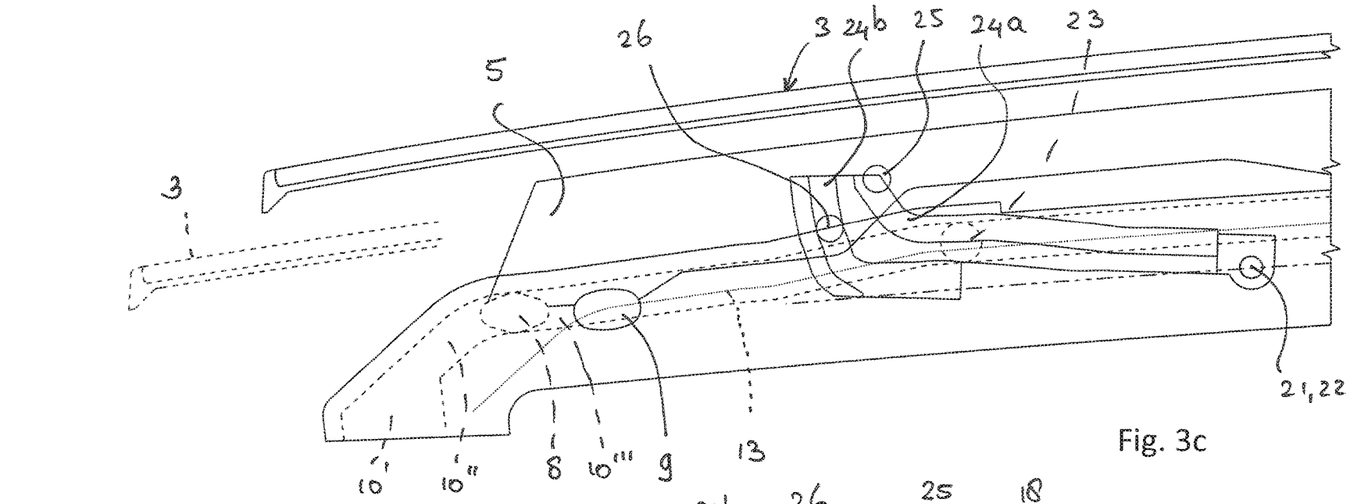

FIG. 3c shows the position of closure panel 3 in which it is moved rearwardly and upwardly on its front side in order to move above roof opening 1, so there is no contact between closure panel 3 and the longitudinal side edge of roof opening 1 when closure panel 3 is slid back and forth. The front side of closure panel 3 is moved upwardly and rearwardly due to the movement of cam 8 through curve portion 10'' of stationary guide curve 10. During the relative movement in longitudinal direction between lever 18 and bracket 5 of panel 3, locking pin 26 on bracket 5 is moved into locking curve section 24b of guide curve 24 in lever 18, and due to the vertical movement of the front side of panel 3 and bracket 5 with respect to lever 18, locking pin is moved upwardly into this locking curve section 24b. Guide cam 23 of lever 18 has reached curve portion 10'''', i.e. the front end of groove 12 in stationary guide rail 6.

Figure 3D:
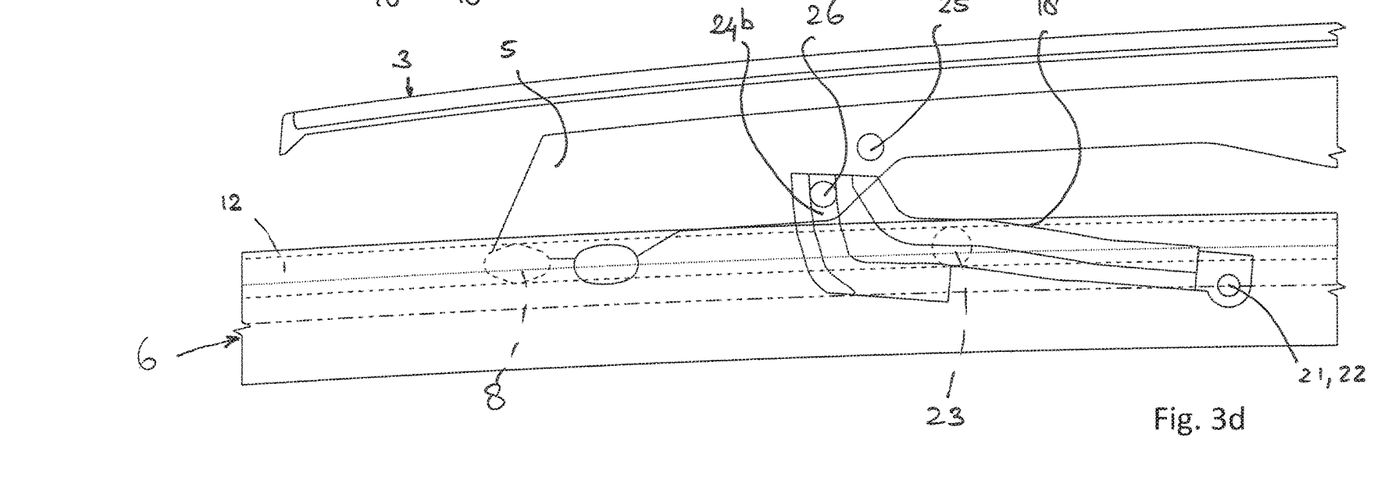
Figure 4:
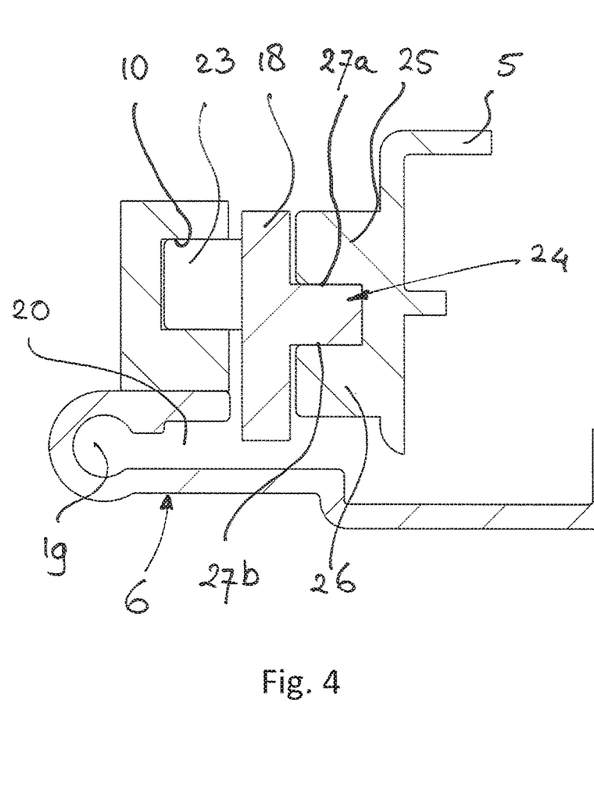
FIG. 4 is an enlarged sectional view according to the line IV-IV in FIG. 3b.
Figure 5A:
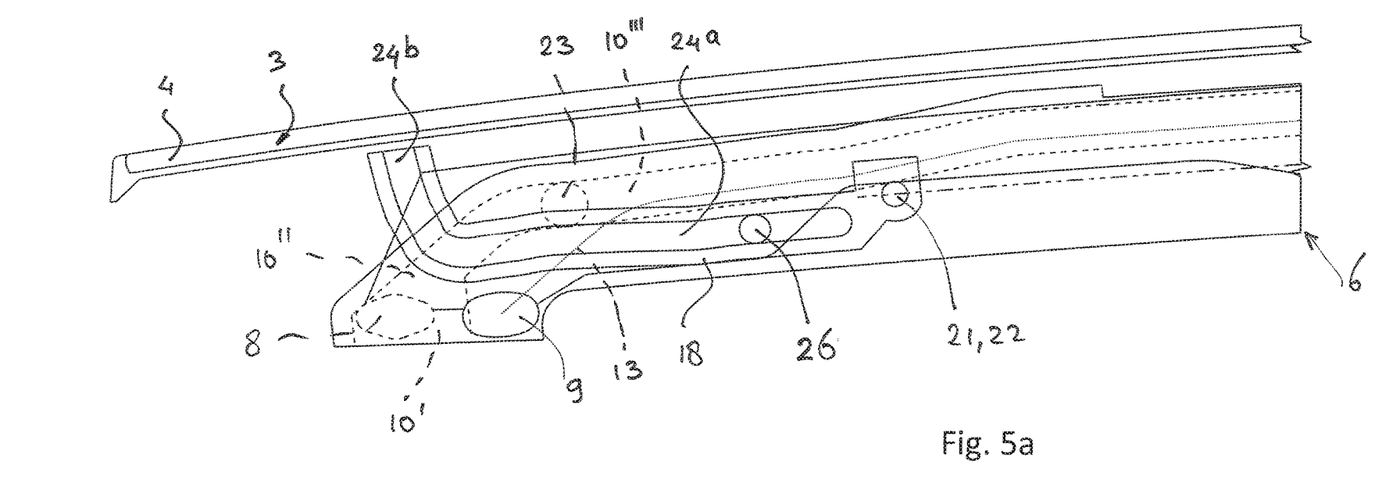
FIG. 5a-5d are views corresponding to those of FIGS. 3a-3d, but showing a second embodiment of the front device.
Figure 5B:
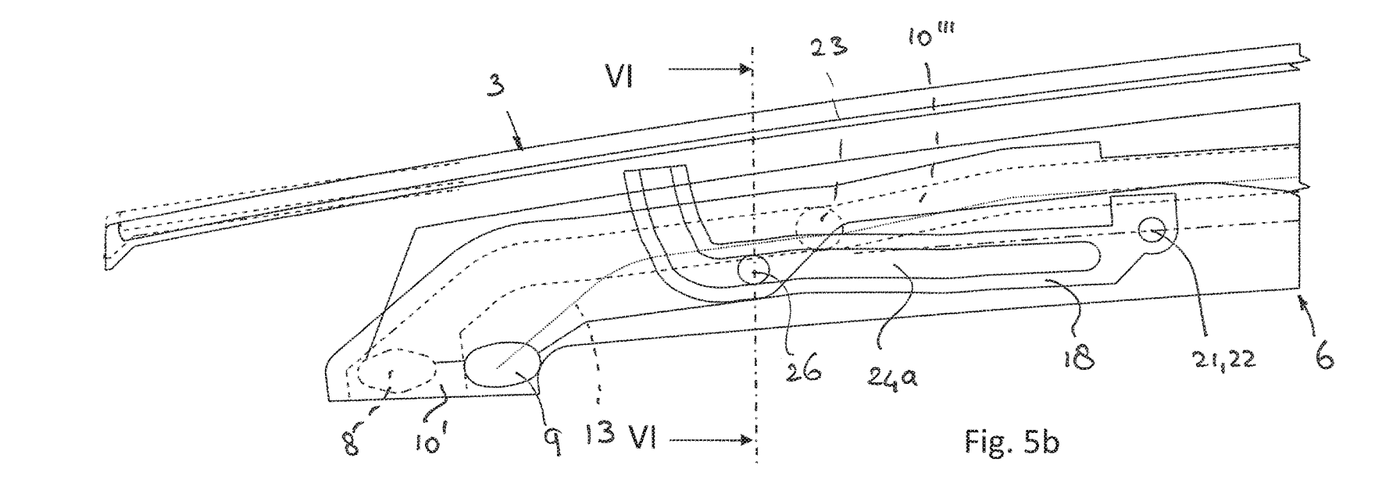
Figure 5C:
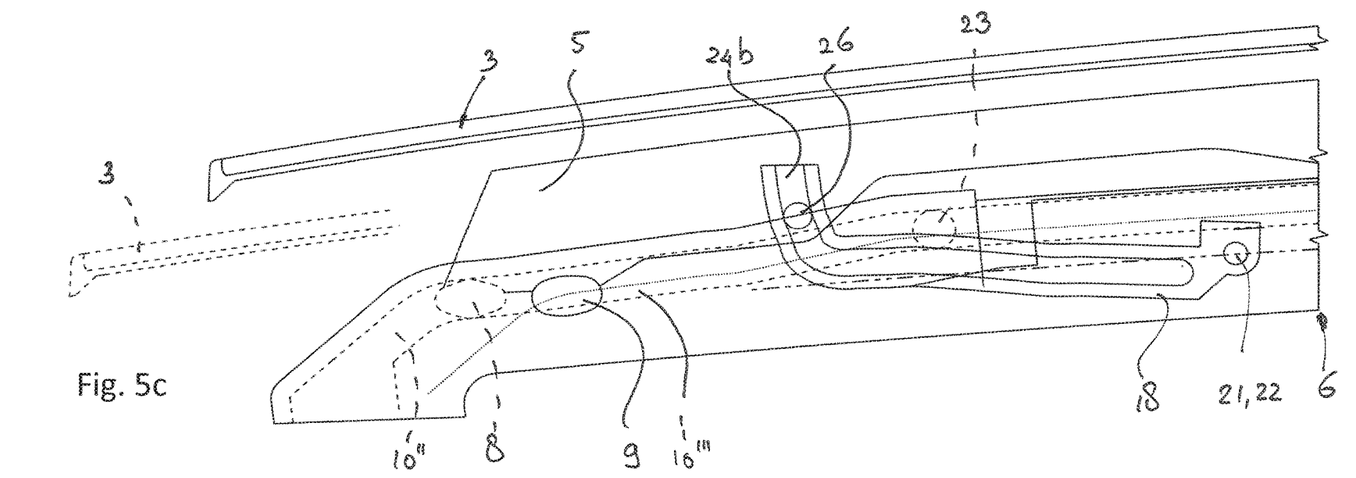
Figure 5D:
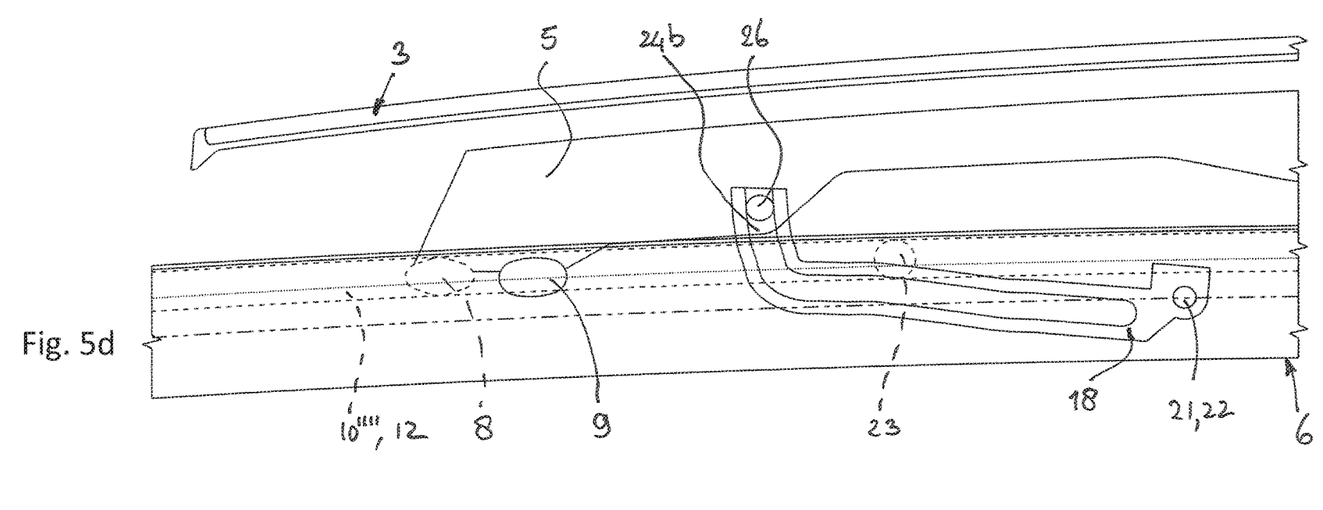
Figure 6:
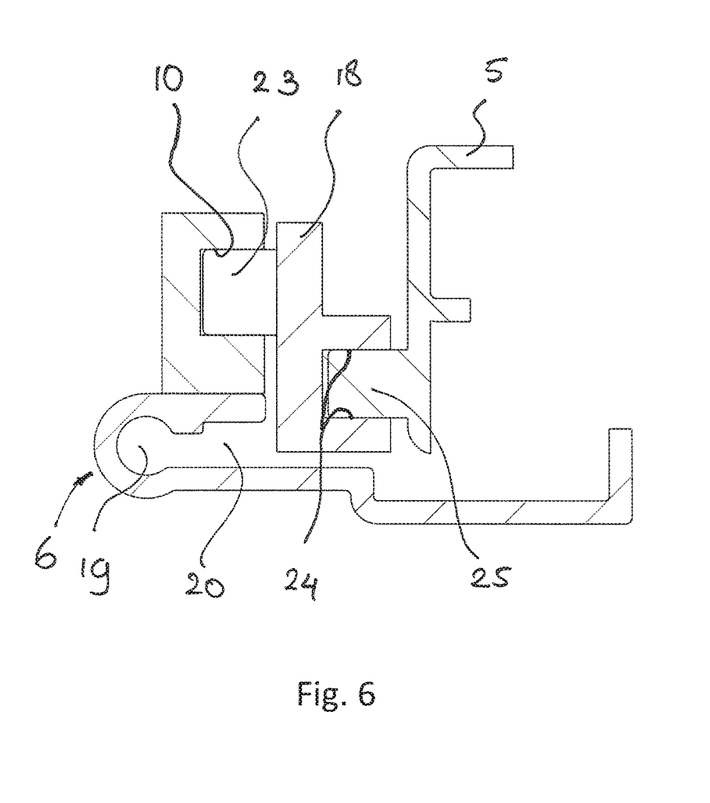
FIG. 6 is an enlarged sectional view according to the line VI-VI in FIG. 5b.
Figure 7A:
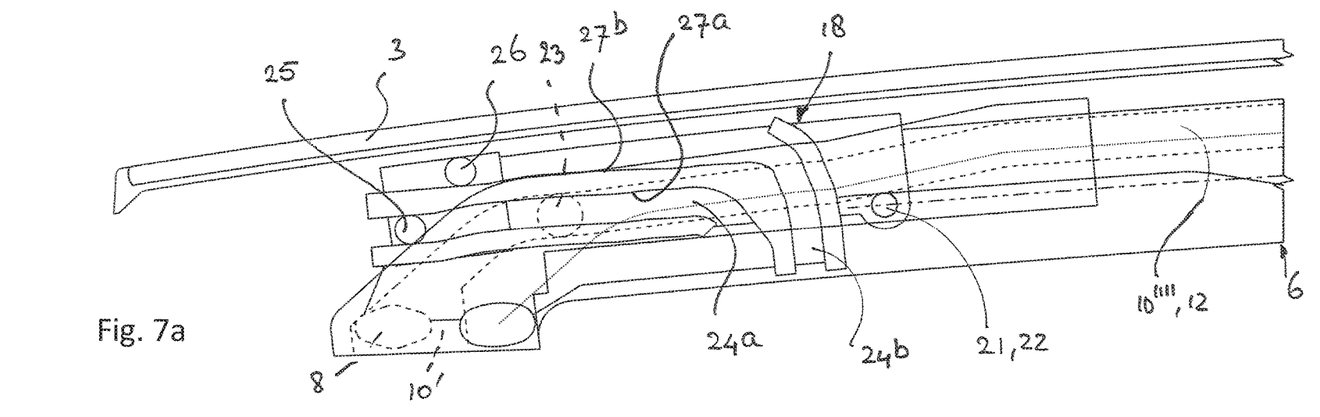
FIG. 7a-7d are views corresponding to those of FIGS. 3a-3d, but showing a third embodiment of the front device.
Figure 7B:
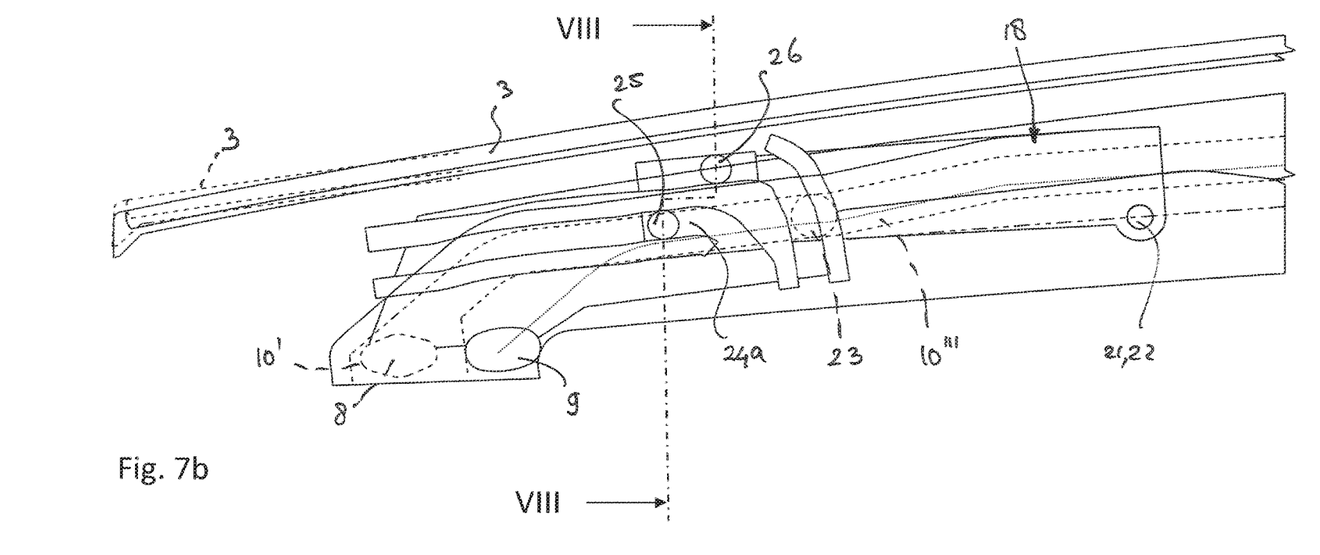
Figure 7C:
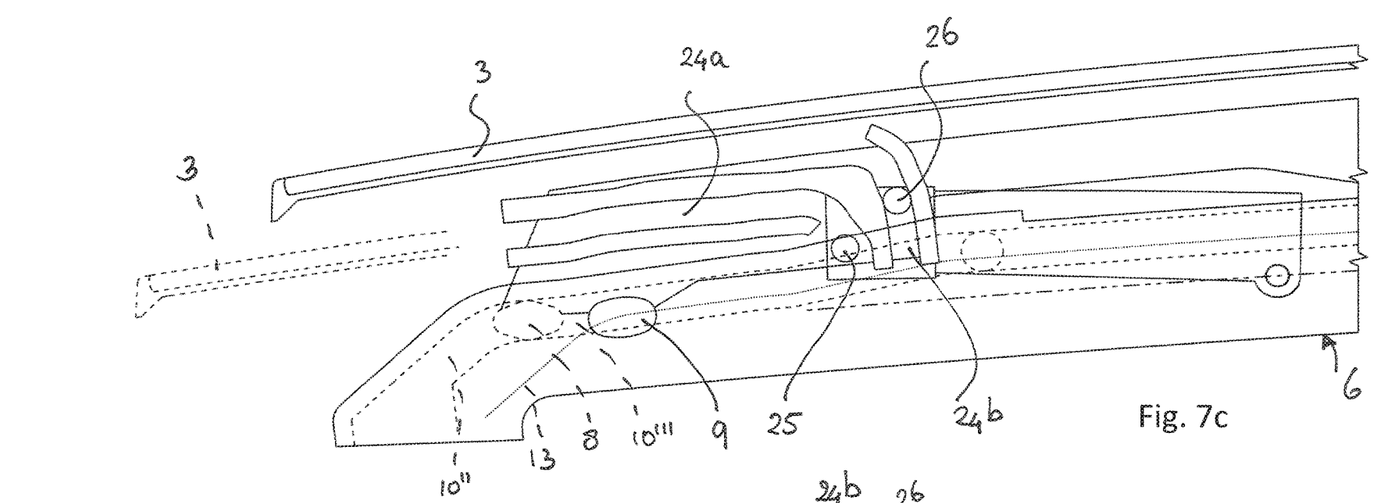
Figure 7D:
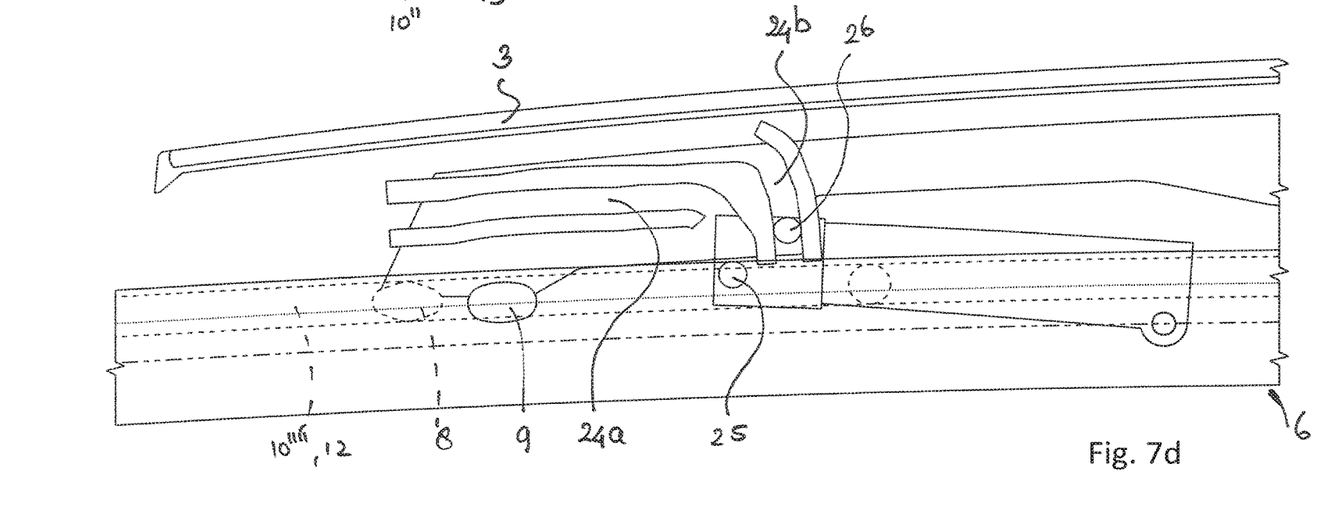
Figure 8:
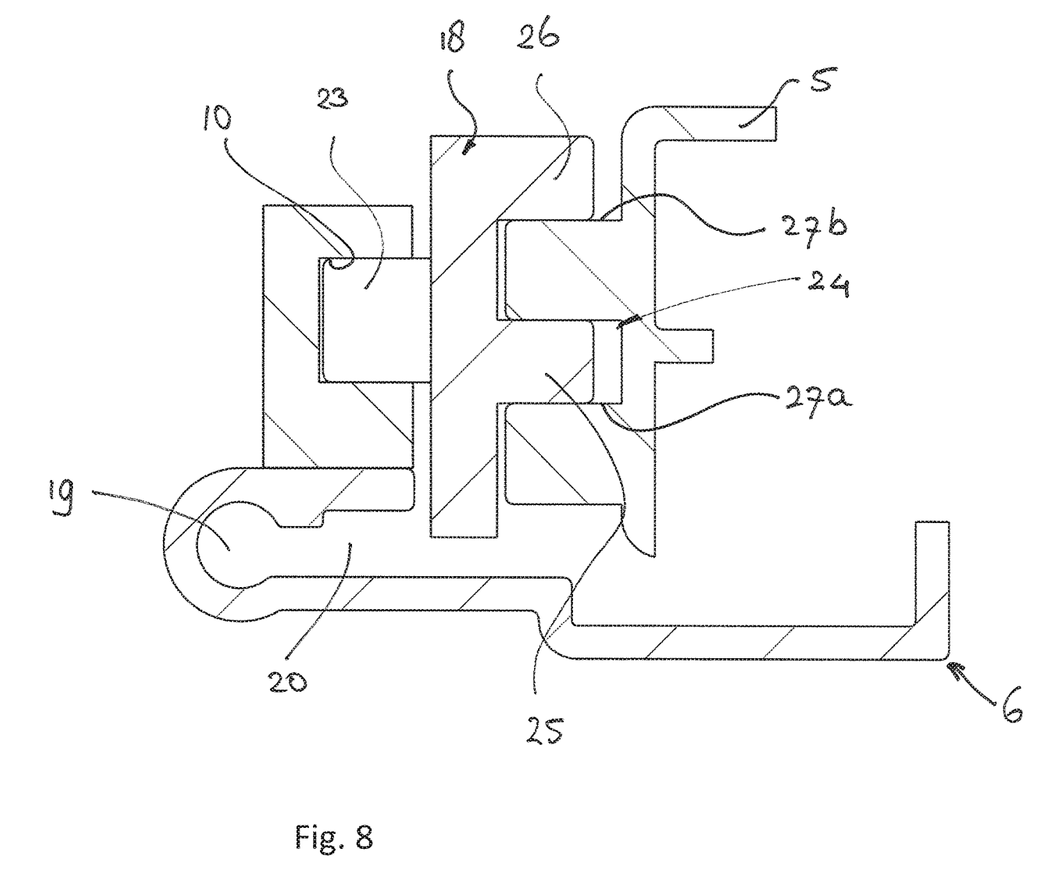
FIG. 8 is an enlarged sectional view according to the line VIII-VIII in FIG. 7b.

In FIG. 3d the closure panel 3 is in its sliding position, in which the front and rear supports of panel 3 slide in guide grooves of guide rail 6, so that panel 3 slides parallel to guide rail 6 and therefore substantially parallel to roof part 2 behind roof opening 1, although further vertical movements of panel 3 would be conceivable. Locking pin 26 and thereby bracket 5 and panel 3 are locked with respect to lever 18/driving slide 17/drive member 16, due to the engagement of locking pin 26 in the substantially vertically extending locking curve section 24b, and the vertical lock of lever 18 due to the engagement of guide cam 23 in guide groove 12 in guide rail 6 and engagement of cams 8, 9 in guide grooves 12, 15 of guide rail 6. The panel 3 is therefore forced to move as a unit with drive member 16, driving slide 17 and lever 18. Guide pin 25 is moved out of engagement with guide curve section 24a, both in the FIG. 3c and FIG. 3d position of panel 3, so that only locking pin 26 is active in these positions.

As locking pin 26 is always active, there is no change over between the engagement of pins 25, 26. Only pin 25 is moved into and out of engagement with guide surface 27a of guide curve section 24a, which is also more reliable than a pin that should enter a slot or groove.

FIGS. 5a-5d and FIG. 6 show the structure and operation of a second embodiment of the front device of the operating mechanism of the roof system. In this embodiment, the guide curve section 24a and the locking curve section 24b of are part of a single curve 24 in the form of a curved slot or groove in which the front end of the guide curve section 24a is connected to and communicates with the rear end of locking curve section 24b. So single pin 26 is always in engagement with curve 24, and in fact lower guide surface 27b of rib 27 in FIG. 3 is similar to the upper wall of curve section 24a in FIG. 5. So the movement of pin 26 in FIG. 5a-5d is the same as of pin 26 in FIG. 3a-3d. The operation of the embodiment of FIG. 5 is the same as in FIG. 3.

FIGS. 7a-7d and FIG. 8 show the structure and operation of a third embodiment of the front device of the operating mechanism of the roof system. In this embodiment, the guide curve 24 of the pin-curve assembly is part of or attached to the bracket 5 of panel 3, whereas the pins 25, 26 are now provided on lever 18. Curve 24 is rotated substantially 180 degrees around a transverse axis with respect to curve 24 in the embodiment of FIG. 3. Although guide curve section 24a is shown as a slot having two walls, the lower wall is not required as pins 25 and 26 cooperate with surfaces 27a and 27b. If pin 26 would not be active in the positions of FIGS. 7a and 7b, the lower wall of guide curve section 24a could take over the function of pin 26.

From the foregoing it will be clear that the invention provides an operating mechanism for an roof system having a front device which is able to precisely control movements of the front edge of the closure panel with a low building height and relatively simple parts. The curve of the pin-curve assembly between the panel and the lever is made either on the panel or on the lever. The invention is not limited to the embodiment shown in the drawings and described above, which may be varied in different manners within the scope of the invention. Features of different embodiment may be combined in other ways. Guide pins and cams may have all kinds of shapes and are not limited to the cross-sectional shapes shown in the drawings. The front device could also be used in other operating mechanisms, such as for tilt-sliding roofs, spoiler roofs and the like. Other movements of the front edge of closure panel could be effected if desired. Rotation of the lever and together with the relative movement between the guide curve section and the cooperating pin(s) provide the vertical movement of the front edge of the panel, but the contribution of each can be varied widely according to the design needs. The function of the guide curve section and the locking curve section could overlap and taken over gradually, and is not necessarily strictly separated.

What is claimed is:

1. A roof system for a vehicle having a roof opening in a roof part thereof, comprising:
   a stationary guide rail at each longitudinal side of said roof opening, each stationary guide rail including a first stationary guide curve portion and a second stationary guide curve portion;
   at least a closure panel which is movable between a closed position in which the closure panel closes the roof opening and an open position in which the closure panel opens the roof opening and is positioned at least partially above an adjoining portion of the roof part, the closure panel being provided with a front support allowing the closure panel to pivot and slide in the first stationary guide curve portion;
   an operating mechanism for each stationary guide rail, each operating mechanism being slidably guided on each corresponding stationary guide rail and configured to operate the closure panel in a longitudinal direction of the vehicle, said operating mechanism comprising:

a front device including a lever configured to move a front edge of the closure panel in a vertical direction; and a driving slide which is slidably accommodated in each guide rail and is drivable by a drive member in order to move the closure panel both in vertical and in horizontal direction through the front device;

wherein the lever of the front device is pivotally connected to the driving slide, is provided with a guide cam which is at least partly in engagement with the second stationary guide curve portion and is in engagement with the closure panel through a pin-curve assembly, wherein a curve of the pin-curve assembly is provided with a guiding curve section extending mainly in a horizontal direction and allowing a corresponding pin to slide along guiding curve section in order to move a front side of the closure panel at least in vertical direction when the lever is driven by the driving slide and the lever rotates due to a displacement of the guide cam of the lever through the second stationary guide curve portion, wherein the curve of the pin-curve assembly is also provided with a locking curve section extending mainly in vertical direction when a corresponding pin is positioned in the locking curve section in order to allow the driving slide to slide the closure panel in longitudinal direction through the pin-curve assembly, and wherein the locking curve section and the guiding curve section are separate, the guiding curve section cooperating with its own corresponding guiding pin during mainly vertical movement of the front edge of the closure panel, and the locking curve section cooperating with its own corresponding locking pin during mainly longitudinal movement of the closure panel.

2. The roof system according to claim 1, wherein the locking curve section and the guiding curve section of the pin-curve assembly are provided on the closure panel and the corresponding pin is provided on the lever.

3. The roof system according to claim 1, wherein the locking curve section and the guiding curve section are positioned in overlapping relationship in vertical direction.

4. The roof system according to claim 1, wherein the guiding curve section is formed by a rib, while the guiding pin and locking pin are in engagement with opposite surfaces of the rib of the guiding curve section when the guiding curve section is guiding the pivoting movement of the lever.

5. The roof system according to claim 1, wherein the locking curve section is a slot in which the locking pin engages when the guiding pin disengages from the guiding curve.

6. The roof system according to claim 1, wherein the front support of the closure panel comprises at least a front support cam engaging the first stationary guide curve portion.

7. The roof system according to claim 6, wherein the front support cam of the front support is guided in the second stationary guide curve portion of the guide cam of the lever.

8. The roof system according to claim 6, wherein the first stationary guide curve portion is provided with an inclined front portion.

9. The roof system according to claim 6, wherein the second stationary guide curve portion is provided with a slightly inclined portion to cooperate with the guide cam to rotate the lever.

10. The roof system according to claim 1, wherein a rear end of the guiding curve section is adjacent a rear end of locking curve section.

11. The roof system according to claim 1, wherein the lever of the front device extends in forward direction from a position where it is pivotally connected to the driving slide.

12. A roof system for a vehicle having a roof opening in a roof part thereof, comprising:

a stationary guide rail at each longitudinal side of said roof opening, each stationary guide rail including a first stationary guide curve portion and a second stationary guide curve portion;

at least a closure panel which is movable between a closed position in which the closure panel closes the roof opening and an open position in which the closure panel opens the roof opening and is positioned at least partially above an adjoining portion of the roof part, the closure panel being provided with a front support comprising at least a front support cam engaging the first stationary guide curve portion allowing the closure panel to pivot and slide;

an operating mechanism for each stationary guide rail, each operating mechanism being slidably guided on each corresponding stationary guide rail and configured to operate s the closure panel in a longitudinal direction of the vehicle, said operating mechanism comprising:

a front device including a lever configured to move a front edge of the closure panel in a vertical direction; and a driving slide which is slidably accommodated in each guide rail and is drivable by a drive member in order to move the closure panel both in vertical and in horizontal direction through the front device;

wherein the lever of the front device is pivotally connected to the driving slide, is provided with a guide cam which is at least partly in engagement with the second stationary guide curve portion and is in engagement with the closure panel through a pin-curve assembly, wherein a curve of the pin-curve assembly is provided with a guiding curve section extending mainly in a horizontal direction and allowing a corresponding pin to slide along the guiding curve section in order to move a front side of the closure panel at least in vertical direction when the lever is driven by the driving slide and the lever rotates due to a displacement of the guide cam of the lever through the second stationary guide curve portion, and wherein the curve of the pin-curve assembly is also provided with a locking curve section extending mainly in vertical direction when a corresponding pin is positioned in the locking curve section in order to allow the driving slide to slide the closure panel in longitudinal direction through the pin-curve assembly.

13. The roof system according to claim 12, wherein the first stationary guide curve portion of the front support cam of the front support is continuous with the second stationary guide curve portion of the guide cam of the lever.

14. The roof system according to claim 12, wherein the first stationary guide curve portion is provided with an inclined front portion.

15. The roof system according to claim 12, wherein the second stationary guide curve portion is provided with a slightly inclined portion to cooperate with the guide cam to rotate the lever.

16. A roof system for a vehicle having a roof opening in a roof part thereof, comprising:

a stationary guide rail at each longitudinal side of said roof opening, each stationary guide rail including a first stationary guide curve portion and a second stationary guide curve portion;

at least a closure panel which is movable between a closed position in which the closure panel closes the roof opening and an open position in which the closure panel opens the roof opening and is positioned at least partially above an adjoining portion of the roof part, the closure panel being provided with a front support allowing the closure panel to pivot and slide in a first stationary guide curve portion;

an operating mechanism for each stationary guide rail, each operating mechanism being slidably guided on each corresponding stationary guide rail and configured to operate the closure panel in a longitudinal direction of the vehicle, said operating mechanism comprising:

a front device including a lever configured to move a front edge of the closure panel in a vertical direction; and a driving slide which is slidably accommodated in each guide rail and is drivable by a drive member in order to move the closure panel both in vertical and in horizontal direction through the front device and rear device;

wherein the lever of the front device is pivotally connected to the driving slide, is provided with a guide cam which is at least partly in engagement with a second stationary guide curve portion and is in engagement with the closure panel through a pin-curve assembly, wherein a curve of the pin-curve assembly is provided on the closure panel and is provided with a guiding curve section extending mainly in a horizontal direction and having at least one open guiding curve section end, and allowing a guiding pin on the lever to slide along the guiding curve section in order to move a front side of the closure panel at least in vertical direction when the lever is driven by the driving slide and the lever rotates due to a displacement of the guide cam of the lever through the second stationary guide curve portion, and wherein the curve of the pin-curve assembly is also provided with a separate locking curve section extending mainly in vertical direction and having at least one open locking curve section end, wherein a locking pin on the lever is positioned in the locking curve section in order to allow the driving slide to slide the closure panel in longitudinal direction through the pin-curve assembly.

17. The roof system according to claim 16, wherein the locking curve section and the guiding curve section are positioned in overlapping relationship in vertical direction.

18. The roof system according to claim 16, wherein the guiding curve section is formed by a rib, while the guiding pin and locking pin are in engagement with opposite surfaces of the rib of the guiding curve section when the guiding curve section is guiding the pivoting movement of the lever.

19. The roof system according to claim 16, wherein the locking curve section is a slot in which the locking pin engages when the guiding pin disengages from the guiding curve.

20. The roof system according to claim 16, wherein a rear end of the guiding curve section is adjacent a rear end of locking curve section.

* * * * *